United States Patent [19]

Prescott

[11] Patent Number: 5,359,850
[45] Date of Patent: Nov. 1, 1994

[54] SELF VENTING CARBON OR GRAPHITE PHENOLIC ABLATIVES

[75] Inventor: Billy H. Prescott, Willard, Utah

[73] Assignee: Thiokol Corporation, Ogden, Utah

[21] Appl. No.: 31,652

[22] Filed: Mar. 15, 1993

[51] Int. Cl.$^5$ ................................................ F02K 1/00
[52] U.S. Cl. ..................................... 60/271; 60/909
[58] Field of Search .............. 60/271, 909, 727; 239/265.11, 265.15; 264/44; 423/447

[56] References Cited

U.S. PATENT DOCUMENTS

| | | | |
|---|---|---|---|
| 3,210,233 | 10/1965 | Kummer et al. | 60/909 |
| 3,639,159 | 2/1972 | Rose et al. | 239/265.15 |
| 3,796,616 | 3/1974 | Northway | 156/60 |
| 4,100,322 | 7/1978 | Seibold et al. | 428/257 |
| 4,119,189 | 10/1978 | Ehrenreich | 60/909 |
| 4,150,540 | 4/1979 | Krayenbuhl et al. | 60/271 |
| 4,193,828 | 3/1980 | Moores et al. | 428/408 |
| 4,215,161 | 7/1980 | Seibold et al. | 427/228 |
| 4,781,223 | 11/1988 | McAliley et al. | 139/420 R |

FOREIGN PATENT DOCUMENTS 1483702 3/1969 Germany ........................ 264/44

Primary Examiner—Richard A. Bertsch
Assistant Examiner—Timothy S. Thorpe
Attorney, Agent, or Firm—Madson & Metcalf

[57] ABSTRACT

Self venting ablative carbon or graphite composite materials are prepared by interspersing low temperature degradable thread within the woven carbon or graphite cloth prior to impregnation with a phenolic or resin matrix. The degradable threads do not degrade during composite curing, but do degrade at a temperature less than the thermal decomposition (char) temperature of the cured composite material. Thus, as the threads decompose, they leave pores throughout the cured composite which are available to vent gaseous decomposition products produced as the resin matrix approaches the char temperature. Venting the resin decomposition products reduces internal pressure within the composite material thereby reducing the likelihood of spalling and ply lifting.

16 Claims, 1 Drawing Sheet

SELF VENTING CARBON OR GRAPHITE PHENOLIC ABLATIVES

BACKGROUND OF THE INVENTION

1. Field of the Invention

This invention relates to solid rocket motor nozzle ablative composites. More specifically, the present invention relates to phenolic ablative composites which are self venting.

2. Technology Review

The combustion of a propellant in a rocket motor creates a hostile environment characterized by extremely high temperature, pressure, and turbulence. The combustion temperature within the motor typically exceeds 6,000° F. Pressure within the motor typically exceeds 1,000 psi. Gas velocities typically range from Mach 0.02 in the inlet region to Mach 10+ at the aft end of the rocket motor nozzle. This environment is particularly hostile in a solid rocket motor because its combustion gas typically contains chemical species and particulates which tend to physically and chemically erode exposed rocket motor nozzle components. While the combustion of the rocket propellant is usually brief, the conditions described above can destroy insufficiently protected or inferior rocket motor nozzles prematurely and jeopardize the mission of the motor.

Parts of a rocket nozzle which are exposed to the high temperatures, pressures, and erosive flow conditions generated by the burning propellant must be protected by a layer of insulation. Various materials have been tried as insulation, such as silica dioxide, glass, or carbon fiber reinforced silicone and/or polyisoprene elastomers, but reinforced resin composite materials are most commonly used. The reinforced resin composite materials are typically prepared by taking squares or plies of resin impregnated carbon or graphite cloth and positioning them in the desired shape. Phenolic resins, such as phenol-formaldehyde resin, are particularly preferred because of their heat resistance, good insulation properties, low cost, and ease of handling and manufacturing.

Solid rocket motor nozzle ablative components consisting of chopped squares of carbon or graphite cloth phenolics molded at low angles (i.e., <40°-60°) to the gas flow, exhibit localized increased erosion, called spalling, resulting in higher than expected erosion. This erosion or spalling may be attributable to the molded part's inability to vent pyrolysis gases that form a small distance below the flame surface of the component.

These molded components are prepared by "chopping" carbon or graphite cloth impregnated with phenolic resin into small squares, often from 0.375 inch to 1.0 inch squares. These chopped squares are then placed in a suitable mold and cured under heat and pressure. Chopped squares molded components represent cost savings in that they do not require slitting and stitching operations required of tape wrap materials, and almost 100% of the prepreg broadgoods can be utilized.

Previous designs incorporating hundreds or thousands of holes drilled to given depths, in a geometric grid, successfully minimized the spalling effect described above. However, this operation was very time consuming and expensive.

Solid rocket motor ablative components are also prepared by tape wrapping carbon or graphite cloth impregnated with phenolic resin around a mandrel or mold. Low tape wrap angles, i.e., <30° (the tape ply angle to gas flow surface), are desirable because of less distortion of the tape required to wrap the component. However, low angle tape wrapped components sometimes exhibit "ply lifting." This phenomenon appears as localized separations between adjacent plies and the inside (gas flow surface) ply ends tend to bend inward. Separations have also been observed below the surface between plies in the phenolic resin char or decomposition transition temperature zone.

It will be appreciated that there is a need in the art for carbon or graphite ablative compositions which avoid spalling and high erosion rates associated with low cost carbon or graphite phenolic molded parts and which also avoid unpredictable ply lifting with low angle-to-centerline tape wrapped carbon or graphite composite ablatives.

Such carbon or graphite ablative compositions are disclosed and claimed herein.

SUMMARY OF THE INVENTION

The present invention solves the problems of spalling and ply lifting by incorporating low temperature, degradable thread or yarn interspersed within the woven carbon or graphite cloth prior to impregnation with the phenolic or resin system. These low temperature degradable threads do not degrade during composite curing, but do degrade at a temperature less than the thermal decomposition and/or char temperature of the cured phenolic material.

As the threads decompose, they leave pores throughout the cured composite which are available to vent gaseous decomposition products produced as the resin matrix approaches the initial exothermic and char exothermic temperatures. It is currently believed that venting the resin decomposition products reduces internal pressure within the composite material which contributes to spalling and ply lifting.

BRIEF DESCRIPTION OF THE DRAWING

In order that the manner in which the above-recited and other advantages and features of the invention are obtained, a more particular description of the invention briefly described above will be rendered by reference to a specific embodiment thereof which is illustrated in the appended drawing. Understanding that this drawing depicts only a typical embodiment of the invention and is not therefore to be considered limiting of its scope, the invention will be described and explained with additional specificity and detail through the use of the accompanying drawing in which.

DETAILED DESCRIPTION OF THE INVENTION

Figure 1:
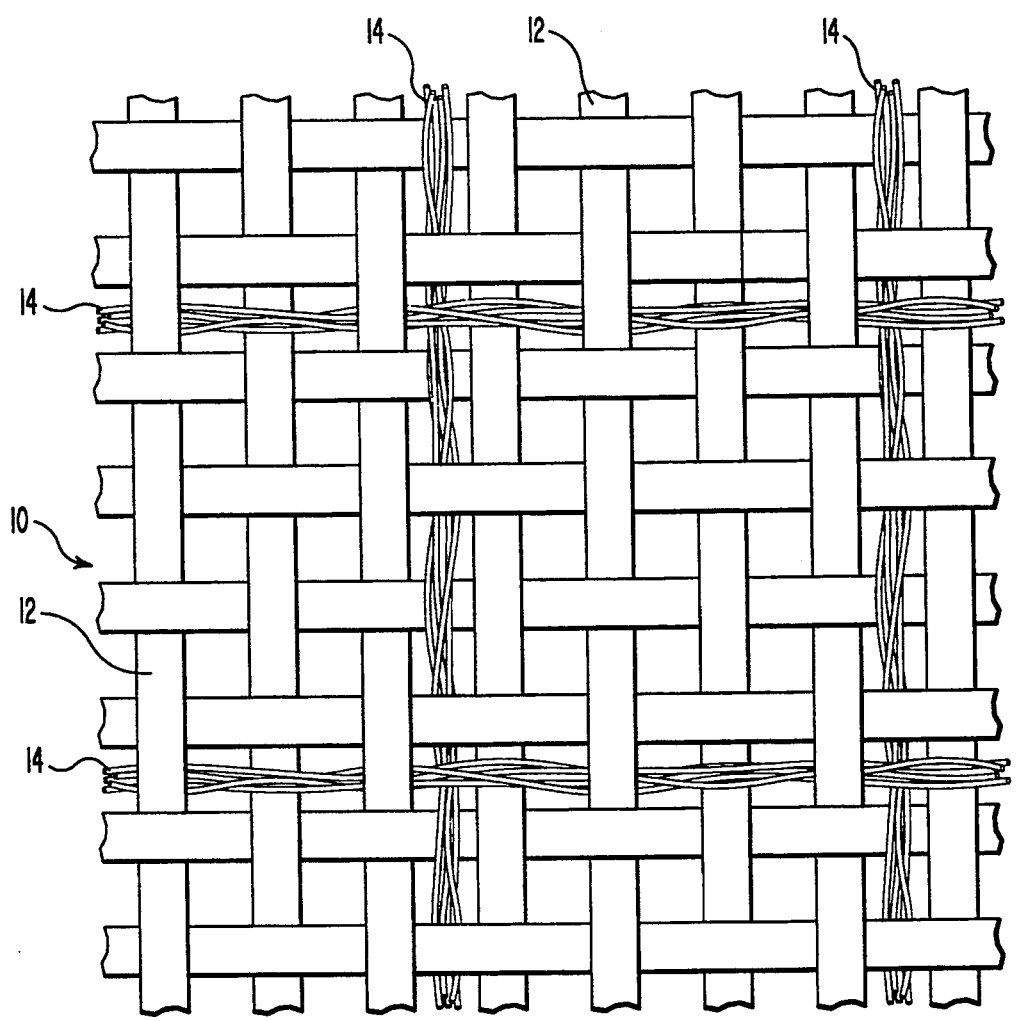
FIG. 1 is a schematic view of a typical fabric woven with carbon or graphite fibers containing low temperature degradable threads interspersed therein.

The present invention is directed to carbon or graphite ablative composite materials having an improved resistance to spalling and ply lifting. These advantages are obtained by interspersing low temperature, degradable thread or yarn within the woven carbon or graphite cloth typically used to prepare the ablative composite materials. FIG. 1 illustrates one possible method of interspersing the low temperature degradable threads within the carbon or graphite cloth. Other methods of interspersing the degradable threads will be apparent to those skilled in the art. As shown in FIG. 1, carbon or graphite cloth 10 comprises a plurality of individual carbon or graphite fibers 12. Carbon or graphite cloth 10 is woven according to procedures well known in the art. Interspersed within the carbon or graphite cloth 10 are a plurality of degradable fibers 14 which may be incorporated into the carbon cloth during or after the carbon cloth is woven.

The carbon or graphite cloth is impregnated with a synthetic resin, such as a phenolic resin system, and cured in a conventional manner. The low temperature degradable threads do not degrade during composite curing, but do degrade at a temperature less than the major thermal decomposition temperatures of the cured composite material.

During use, the composite material is rapidly heated by the rocket motor gases, beginning at the surface, to a temperature, approximately from about 400° F. to 500° F., that is greater than the 310° F. to 325° F. cure temperature of the thermosetting resin causing degradation of the low temperature degradable threads. As the threads degrade, voids or pores are left within the composite material. The temperature continues to rises to the point where the resin matrix's first rapid decomposition producing gaseous decomposition products, usually from about 550° F. to 675° F. The gaseous decomposition products are vented to the surface through the voids and pores left by the degraded threads without causing undue pressure build up within the composite. Ultimately, the extremely high temperature of the burning propellant causes charring of a portion of the ablative composite material (typically at temperatures above about 900° F.).

It is currently believed that venting the resin decomposition products reduces internal pressure within the composite material, thereby reducing the likelihood of undesirable spalling and ply lifting.

The low temperature degradable thread materials used within the scope of the present invention are preferably selected such that they decompose at a temperature greater than the cure temperature of the resin, but below the initial rapid decomposition temperature of the resin. Typical thread materials include nylon prepared from hexamethylene diamine and acetic acid, or its derivatives, polyethylene glycol terephthalate polyester, polytetrafluoroethylene, or polypropylene, or any other material that degrades at a temperature in the range from about 400° F. to 500° F., and preferably between about 425° F. to 475° F.

These low temperature degradable threads could be woven into any typical carbon or graphite fabric weaves such as plain, 5-harness satin, 8-harness satin, etc. and at any desirable frequency. The frequency of addition in either the warp or fill directions would be determined by the component ply angle to gas flow surface angle and that component's particularly expected char depth versus gas flow length to the free surface for venting. This can be determined through a series of experiments evaluating yarn frequency versus ply angles using a subscale (70-pound char motor blast tube sections) to determine optimum design versus angle, etc.

In addition to providing self-venting for low angle tape wrapped components, material chopped into small squares (i.e., ½ inch or 1 inch squares) would provide self-venting after being molded into ablative components. This self-venting feature would negate the need for the previously demonstrated approach of drilling hundreds or thousands of vent holes in each molded component as described above.

The following examples are offered to further illustrate the present invention. These examples are intended to be purely exemplary and should not be viewed as a limitation on any claimed embodiment.

EXAMPLE 1

Tape wrapped self venting phenolic ablative composites within the scope of the present invention are prepared by obtaining an eight harness satin carbon cloth, such as Amoco VCL, Polycarbon CSA, or Hitco CCA or a plain weave graphite cloth such as Amoco WCA or Polycarbon GSQ, which is impregnated with a phenol-formaldehyde phenolic resin such as Ironsides SC-1008 or B.P. Chemicals 91LD, and carbonaceous powder fillers. A degradable polyester fiber is interspersed throughout the carbon or graphite cloth. Cloth strips are tape wrapped at 0° to 30° to gas flow on a hardened steel mandrel. The wrapped strips are cured at 310° F. to about 320° F. for 4–8 hours, under vacuum and pressure. Tape wrapped ablative components thus prepared have typical erosion-char without ply lifting at the surface or below the char line.

EXAMPLE 2

Molded self venting phenolic ablative composites within the scope of the present invention are prepared by obtaining an eight harness satin carbon cloth, such as Amoco VCL, Polycarbon CSA, or Hitco CCA or a plain weave graphite cloth such as Amoco WCA or Polycarbon GSQ, which is impregnated with a phenol-formaldehyde phenolic resin such as Ironsides SC-1008 or B.P. Chemicals 91LD, and carbonaceous powder fillers. A degradable polyester fiber is interspersed throughout the carbon or graphite cloth. Chopped squares (from 0.375 to 1.0 inch squares) are placed in a female mold half and de-bulked. The de-bulked squares are cured at 310° F. to about 320° F. and 1250 psi±250 psi for 4–8 hours in steel molds. Molded ablative components thus prepared have typical uniform erosion surface similar to tape wrapped or drilled hole vented materials.

From the foregoing it will be appreciated that the present invention provides carbon or graphite ablative compositions which avoid spalling and high erosion rates associated with low cost carbonaceous phenolic molded parts and which also avoid unpredictable ply lifting with low angle-to-centerline tape wrapped carbonaceous composite ablatives.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A process for preparing an ablative fiber composite insulation material for use on a rocket motor nozzle comprising:
   (a) positioning a reinforcing cloth containing degradable fibers interwoven therein into a desired rocket motor nozzle shape, said reinforcing cloth being impregnated with a thermosetting resin binder; wherein the degradable fibers degrade at a temperature above the cure temperature of the thermosetting resin binder and below the decomposition temperature of the thermosetting resin binder; and (b) curing the resin binder to form a solid ablative fiber composite insulation material.

2. A process for preparing an ablative fiber composite insulation material as defined in claim 1, wherein the reinforcing cloth comprises graphite cloth.

3. A process for preparing an ablative fiber composite insulation material as defined in claim 1, wherein the reinforcing cloth comprises carbon cloth.

4. A process for preparing an ablative fiber composite insulation material as defined in claim 1, wherein the thermosetting resin binder is a phenolic resin binder.

5. A process for preparing an ablative fiber composite insulation material as defined in claim 1, wherein the degradable fibers degrade at a temperature in the range from about 400° F. to 500° F.

6. A process for preparing an ablative fiber composite insulation material as defined in claim 1, wherein the degradable fibers include nylon, polyester, polytetrafluoroethylene, or polypropylene.

7. A process for preparing an ablative fiber composite insulation material as defined in claim 1, wherein the reinforcing cloth is positioned into the desired rocket motor nozzle shape by tape wrapping the reinforcing cloth around a mandrel.

8. A process for preparing an ablative fiber composite insulation material as defined in claim 1, wherein the reinforcing cloth is cut into small pieces and molded into the desired rocket motor nozzle shape.

9. An ablative fiber composite insulation material for use on a rocket motor nozzle comprising a cured thermosetting resin binder composite composition positioned into a desired rocket motor nozzle shape, wherein said thermosetting resin binder composite composition includes a reinforcing cloth containing degradable fibers interwoven therein, said reinforcing cloth being impregnated with the thermosetting resin binder such that the degradable fibers degrade at a temperature above the cure temperature of the thermosetting resin binder and below the decomposition temperature of the thermosetting resin binder.

10. An ablative fiber composite insulation material as defined in claim 9, wherein the reinforcing cloth comprises graphite cloth.

11. An ablative fiber composite insulation material as defined in claim 9, wherein the reinforcing cloth comprises carbon cloth.

12. An ablative fiber composite insulation material as defined in claim 9, wherein the thermosetting resin binder is a phenolic resin binder.

13. An ablative fiber composite insulation material as defined in claim 9, wherein the degradable fibers degrade at a temperature in the range from about 400° F. to 500° F.

14. An ablative fiber composite insulation material as defined in claim 9, wherein the degradable fibers include nylon, polyester, polytetrafluoroethylene, or polypropylene.

15. An ablative fiber composite insulation material as defined in claim 9, wherein the reinforcing cloth is positioned into the desired rocket motor nozzle shape by tape wrapping the reinforcing cloth around a mandrel.

16. An ablative fiber composite insulation material as defined in claim 9, wherein the reinforcing cloth is cut into small pieces and molded into the desired rocket motor nozzle shape.

* * * * *